G. S. WHITE.
RECORD BOOK.
APPLICATION FILED FEB. 7, 1919.

1,322,275.

Patented Nov. 18, 1919.
2 SHEETS—SHEET 1.

Fig. 1.

| FIRST LETTERS OF GIVEN NAMES | CODE CHARACTERS | | | FIRST LETTERS OF GIVEN NAMES | CODE CHARACTERS | | | FIRST LETTERS OF GIVEN NAMES | CODE CHARACTERS | | |
|---|---|---|---|---|---|---|---|---|---|---|---|
| | M | R | MISC. | | M | R | MISC. | | M | R | MISC. |
| A B C | 2 | 4 | 6 | J K L | 20 | 22 | 24 | T U V | 38 | 40 | 42 |
| D E F | 8 | 10 | 12 | M N O | 26 | 28 | 30 | W X Y Z | 44 | 46 | 48 |
| G H I | 14 | 16 | 18 | P Q R S | 32 | 34 | 36 | CORPORATIONS FIRMS ASSOCIATIONS | 50 | 52 | 54 |

Fig. 2.

THE M-R MISCELLANEOUS INDEX CODE SYSTEM IS BASED UPON THREE SUB-DIVISIONS OF THE FAMILY NAME. THE NAMES ARE CLASSIFIED BY COLUMNS HEADED M-R-MISCELLANEOUS. WHEN USING THE CODE OMIT THE FIRST LETTER IN THE NAME. IN THE M COLUMN ALL NAMES ARE ENTERED THAT THE FIRST CODE CHARACTER IN THE NAME IS M. IN THE R COLUMN ALL NAMES ARE ENTERED THAT THE FIRST CODE CHARACTER IN THE NAME IS R. IN THE MISCELLANEOUS COLUMN ALL NAMES ARE ENTERED THAT DO NOT CONTAIN THE CODE LETTERS M OR R. COLUMNS ARE ALSO PROVIDED FOR THE FIRST LETTERS OF GIVEN NAMES. FOR CORPORATIONS, FIRMS AND ASSOCIATIONS USE THE FIRST WORD IN THE NAME OMITTING THE. USE TABLE ON OPPOSITE PAGE TO LOCATE NAME DESIRED. AFTER EACH NAME IN THIS SUB-INDEX A PAGE NUMBER REFERS THE SEARCHER TO ALL THE INSTRUMENTS OF RECORD IN SUCH NAME.

INVENTOR
Justine S. White,
by Chas. J. O'Neill. Attorney

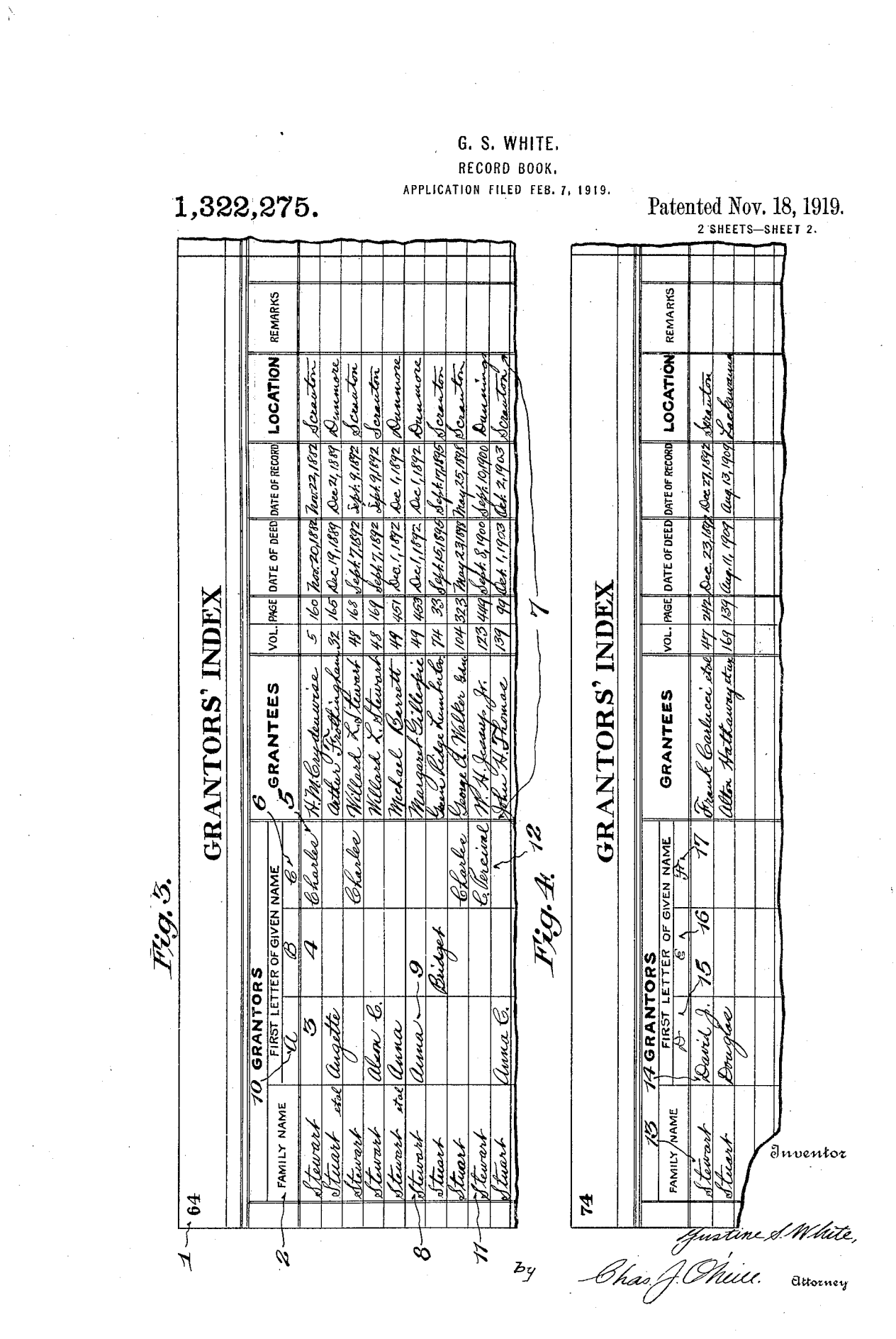

G. S. WHITE.
RECORD BOOK.
APPLICATION FILED FEB. 7, 1919.

1,322,275.

Patented Nov. 18, 1919.
2 SHEETS—SHEET 2.

Fig. 3.

GRANTORS' INDEX

Fig. 4.

GRANTORS' INDEX

Inventor
Gustine S. White,
by Chas. J. O'Neill, Attorney

UNITED STATES PATENT OFFICE.

GUSTINE SNOWDEN WHITE, OF SCRANTON, PENNSYLVANIA.

RECORD-BOOK.

1,322,275.	Specification of Letters Patent.	Patented Nov. 18, 1919.

Application filed February 7, 1919. Serial No. 275,509.

*To all whom it may concern:*

Be it known that I, GUSTINE S. WHITE, a citizen of the United States, residing at Scranton, in the county of Lackawanna and State of Pennsylvania, have invented certain new and useful Improvements in Record-Books; and I do hereby declare the following to be a full, clear, and exact description of the invention, such as will enable others skilled in the art to which it appertains to make and use the same.

This invention relates especially to books for indexing and grouping together in ledger form various records.

An object of the invention resides in the provision of an index, by means of which the searching of records will be greatly simplified, and the time consumed in making such a search will be reduced to a minimum. Furthermore the liability of overlooking a recorded instrument will likewise be reduced to a minimum.

In the description of the invention I will refer particularly to a grantor's deed index only; which consists of three constituent parts, namely a body index, a front index, and a sub-index to the front index, but it is to be understood that the system of indexing can be adapted to various other records, as will be perfectly obvious.

Figure 1 is a view of a fragment of a page containing the sub-index to the front index;

Fig. 2 is a fragment of a page of the front index;

Fig. 3 is a fragment of a page of the body index; and

Fig. 4 is a fragment of a page of the body index.

In this respect it is to be understood that the leaves may, of course, be associated with each other in any suitable and convenient manner, as the method of securing or binding the leaves together is not material to the present invention. I will, however, describe the leaves as being leaves of a bound volume. Referring to Fig. 3 of the drawing, it will be seen that this leaf is numbered at the upper corner, as at 1, the particular number of the page being 64. The pages of the book are all numbered consecutively, and the numbers not only are applied to the body index, but also to the front index, but I would have it understood that the body index could be numbered with another set of figures if desired, without materially varying from the invention.

In making up the index, when an instrument is presented for record, the family name of the grantor is placed on one of the pages of the body index under the proper heading, which indicates that the name is the family name, said heading being represented at 2 in Fig. 3. The adjacent portion of the grantor's heading is divided into three columns, 3, 4, and 5, and the operator designates and writes in the letters for the three columns with the proper letters for given or Christian names to accord with sub-index letters printed on the top of the pages of the front index, because the three columns under the heading, "First letter of given name" are not printed in the book, for reasons that I will later explain. In the succeeding columns the other necessary data are recorded, said data being indicated generally at 7. For example, if an instrument is presented under the name of "Anna Stewart" as grantor, the name "Stewart" is placed under the "Family name" heading 2, at 8, and the name "Anna" is placed in the column 3, at 9. This column is given the heading "A" at 10, which indicates that the first letter of the given or Christian name is "A". At the same time the letters "B" and "C" are placed above the columns 4 and 5, so that when an instrument is presented for record under the name of "C. Percival Stewart", for instance, "Stewart" is placed under the "Family name" heading at 11, and the "C. Percival" is placed under the "C" heading at 12. The same scheme is followed out when an instrument is presented for record where the Christian name of the grantor begins with "B", the Christian name being placed under the "B" column. It may be here stated that the selection of the page of the body index on which to record the instrument, is purely arbitrary, and the position of the page is likewise arbitrary, as is indicated by the family names on page 64, as illustrated in Fig. 3, or as illustrated in Fig. 4, where a portion of page 74 is shown. If an instrument is presented under the name of "David J. Stewart" as grantor, a page is selected, and the family name is placed under the "Family name" heading at 13, and the given name "David J." is arranged under the proper heading "D", which is shown at 15, and the remaining adjacent columns are at the same time designated by the next succeeding letters of the alphabet as at 16 and 17, the letters being in this case "E" and "F". It must be understood that family names that are spelled various ways, such as Stewart, Stuart, etc., are placed in the same account in the body index, and the various spellings are also noted in the front index. For illustration of this see Fig. 3 of drawing of body index, and also Fig. 2 of drawing of front index.

Thus it will be obvious that when an instrument is presented for record in which the grantor's given or Christian name begins with "A", the family name is entered in a column on an arbitrarily selected page under the heading of "Family name" and the given name is entered in an adjacent column under the heading "A", which is designated by the first letter of the Christian name. At the same time the operator writes in the proper columns the three heading letters "A", "B" and "C" under the heading "First letter of given name," so that subsequently if an instrument is presented for record with the same family name in which the grantor's Christian name begins with "A", "B" or "C" the family name is entered beneath the "Family name" column, and the grantor's Christian name is placed beneath the proper heading "A", "B" or "C", as designated by sub-index to front index. Then again, if an instrument is presented wherein the given name of the grantor begins with "D", a page is arbitrarily selected and the family name is placed in the proper column, while the given name is placed beneath the heading "D", which the operator enters in the proper column, as indicated in the sub-index to the front index, and also writes the letters "E" and "F" which are the succeeding letters of the alphabet in their proper columns, according to the said sub-index to the front index, so that if instruments of the same family name are subsequently presented, where the given names begin with "D", "E" or "F", these instruments are recorded in the same account on the same page, and the given names are arranged beneath the proper letters. The same scheme is followed throughout the body index, when an account is opened for a family name, the proper three letters for given or Christian name columns are obtained from the sub-index of the front index, printed on the top of the pages of the front index, and written in the columns in their proper chronological order, except in such instances as it is found desirable to group in the same column two letters indicating the first letter of the Christian name. For instance, "P" and "Q" are grouped together in one column, for it has been found by experience that there are very few instruments presented where the given name begins with "Q", and therefore, it is unnecessary to use a separate column for this letter. Of course, there are certain other letters in the alphabet which are seldom used for Christian names, and these too, may be grouped with the preceding or succeeding letter of the alphabet. It is, of course, to be understood that it is desirable to divide the names of grantors into convenient groups, and for this purpose a separate book is generally provided for each letter of the alphabet, the book illustrated in the drawing being for the letter "S".

In this manner, the body index is made up. The value of making an index in this way, with accounts of a particular family name, provided with three columns designed with headings of the first letters of given or Christian names, thereby combining in one account all the instruments of a particular family name, whose given or Christian names commence with three different letters is manifold. To illustrate this I will refer to Fig. 3 of the drawing, which shows that all the "A" Stewarts, all of the "B" Stewarts, and all of the "C" Stewarts are in one account. Thus it is perfectly obvious that by the use of this plan of combining in one account the "A", "B", and "C" Stewarts, the necessity of opening three accounts is avoided, and the extra labor of opening two other accounts is saved. Particular attention is called to the fact that by opening one account instead of three accounts the capacity of the book is saved, and will last much longer, as it will contain only about one-third of the number of accounts, consequently the book expands to better advantage. However, I would have it understood that the body index could be provided with two, four or more columns, with headings for the first letters of given or Christian names, without varying materially from the invention. Let it be also understood, that when a searcher is making an abstract, that while the "A", "B", and "C" Stewarts are in one account, the "A" Stewarts are together, the "B" Stewarts are together, and the "C" Stewarts are together. Another valuable reason for making a body index in this manner is that it may be indefinitely expanded, as an account may be placed upon any selected page, and the given or Christian name columns designated by the proper letters, thereby rendering all the pages of the body index useful, because the given or Christian name heading columns have been left blank.

The pages of the front portion of the book are used for the front index, and are associated with a printed sub-index, provided on the top of the right hand pages of each page of the front index, when the front index is opened, and on the top of the left hand pages of each page of the front index, when the front index is opened, the instructions for operating the sub-index code characters are printed. However, I would have it understood that the top of both pages of the front index could be used for the sub-index code characters without materially varying from the invention. These pages are numbered, as before stated, as at 18, and these numbers form part of the series which extends through the body index. All family names are entered on the pages in the columns provided in the front index in accordance with the instructions, and sub-index code characters printed on the top of said front index, and at same time the family name is entered, the page number of the body index upon which said account is opened, is entered on the same line, opposite the family name in a suitable column provided for said page number, for instance at 20 of Fig. 2, and as before stated when a family name is spelled in various ways, such as Stuart, Stewart, and Steward, the various spellings are noted on the same line in the front index. Of course, if two or more instruments are presented for record under the name of "Anna Stewart," for instance, this indexing is done on the same page of the body index, and in this event it will only be necessary for the name "Stewart" to appear once in the front index, as the column headed "A" under the heading "First letter of given name" in the body index has been provided with the letter "A," and also with the letters "B" and "C" to index any other instruments that may be presented for record later.

The sub-index of the front index is based upon three code characters of the family name, namely: M, R, and Miscellaneous, and names are classified by columns headed M, R, and Miscellaneous. In using the code characters omit the first letter in the name from consideration. In the "M" column all names are classified that have the letter "M" in the name, that the first code character is "M;" for example the name Smith would be classified in an "M" column. In an "R" column all names are classified that the first code character in the name is "R;" for example the name Sheridan would be classified in the "R" column. In a "Miscellaneous" column all names are classified that do not contain the code characters "M" or "R;" for example the name Snell would be classified in the "Miscellaneous" column. The code characters M, R, and Miscellaneous have a series of columns 22, 23, and 24, associated with them containing groups of letters that are the first letters of given names, except in cases where the name is a corporation, firm, or association, in which case the first word in the name is used omitting always "The" from consideration. These columns contain groups of three letters each, as A, B, C: D, E, F: G, H, I: etc., with the exception of the groups containing the letter "P" and the letter "X." These two groups contain four letters, the letter "Q" being associated with the letter "P," and the letter "Y" with the letter "X," which is the same association which is made in the body index, and which has previously been described. Arranged beside each of these column of groups of letters are vertical columns of numbers which are indicated generally at 25, 26, and 27, and which are arranged beneath headings 28, 29, and 30, which headings are invariably "M," "R," and "Miscellaneous," and which designate the code characters of the family name. Any one of the numbers in the columns 25, 26, and 27 designate a page of the front index on which a name appears, which name includes the code characters "M," "R," and "Miscellaneous," and which name includes in the body index a given name beginning with a letter which appears to the left of the particular number. By way of example, consider the name "Anna Stewart." The letter "R" appears in this name, therefore, the operator will turn to the column 26 which is beneath the code character "R," and will observe the number "4" which is arranged in horizontal alinement with the letter "A" in the column 22. Turning to page 4 of the front index, he will observe the name "Stewart," with 64 written after it and turning to page 64 to which the front index refers, he will find in the body index all the deeds in which "Anna Stewart" is the grantor. The value of printing a sub-index of a front index on the top of the pages of a front index, is very manifest, as it is always well preserved, affording the person using it a clear, and exact guide to the name being searched. Another valuable reason for printing the sub-index of a front index on the top pages of a front index is, that it saves cutting in an index, which tears easily after having been cut in. Still another reason is, that the letters or characters printed on the tabs of a cut in index, become dirty, and often rubbed off by constant use of the thumb, thereby making the letters or characters indistinct, and sometimes useless. I would also have it further understood that the printing of a sub-index table on the top pages of a front index can be applied to various other records requiring a front index, where sub-divisions for names are needed, and not only to the work herein described. Let it be further understood that the code characters M, R and Miscellaneous can be applied in various other ways than herein described.

Having described the body index, the pages, a sub-index referring to the pages of the front index by the characters "M", "R" and "Miscellaneous" which corresponds to the character in the name in the front index.

6. An index including a body index which consists of headings which correspond to the letters of the alphabet, said headings being arranged in convenient groups on separate, arbitrarily selected numbered pages, names arranged on said page with the family names in groups and the given names associated with the headings so that the first letter of the given names corresponds to the associated heading, a front index consisting of family names written on arbitrarily selected numbered pages, which names correspond to the family names in the body index and separated according to the first letter of the given name of the corresponding names in the body index to which they refer, the numbers of the pages of the body index being arranged beside the index names in the front index, a sub-index including lists of numbers corresponding to the numbers of the pages of the front index, the characters "M", "R", and "Miscellaneous" being associated with said numbers in the sub-index and the letters of the alphabet being divided into groups similar to those of the body index and associated with the numbers of the pages of the front index whereby the name in the front index which corresponds to a name in the body index may be located.

In testimony whereof I affix my signature.

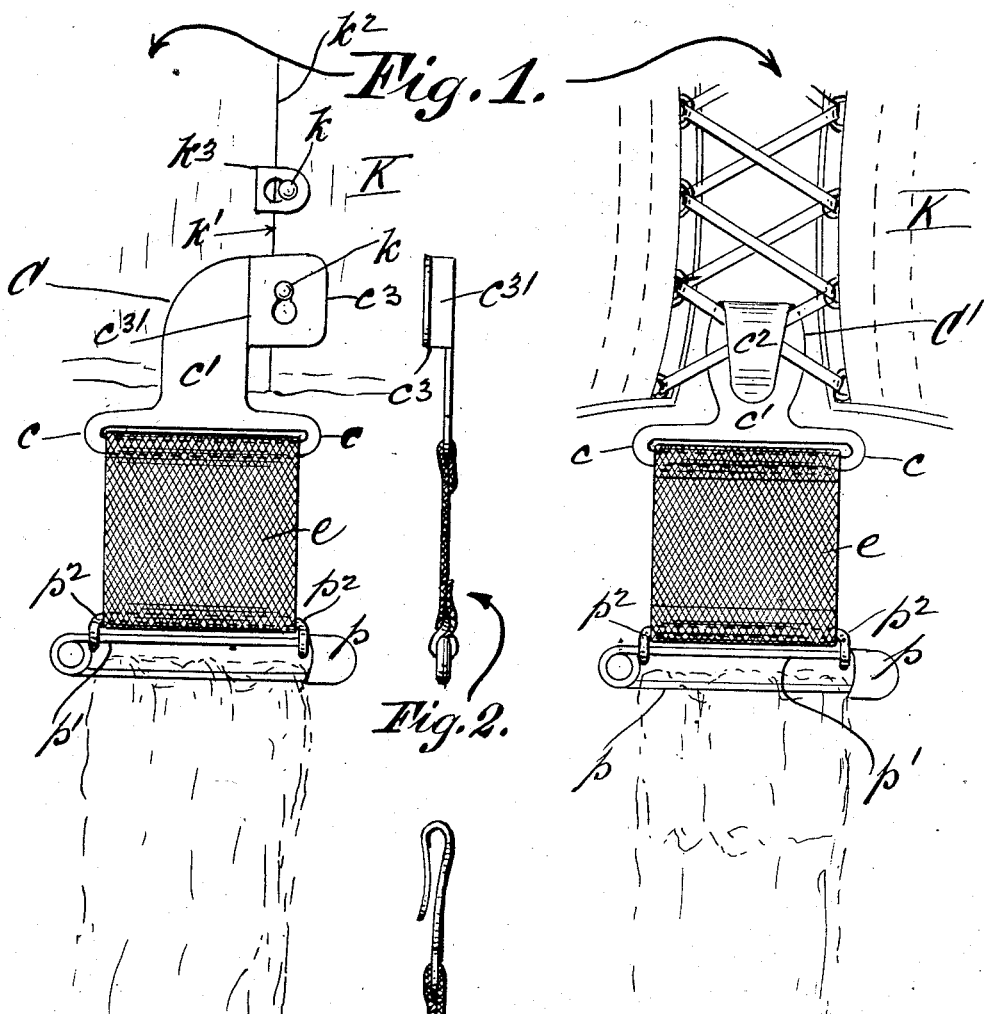

GUSTINE SNOWDEN WHITE.